United States Patent
Mathiyalagan et al.

(10) Patent No.: US 11,758,055 B2
(45) Date of Patent: *Sep. 12, 2023

(54) SYSTEM AND METHOD OF AUTOMATED CUSTOMIZABLE PORTAL CREATION

(71) Applicant: TierOne OSS Technologies Inc., Mississuaga (CA)

(72) Inventors: Ramachandra Prabu Mathiyalagan, Mississuaga (CA); Paul Vedam, Mississuaga (CA)

(73) Assignee: TierOne OSS Technologies, Inc., Mississuaga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,595

(22) Filed: Dec. 8, 2021

(65) Prior Publication Data

US 2022/0103695 A1    Mar. 31, 2022

Related U.S. Application Data

(63) Continuation of application No. 16/844,261, filed on Apr. 9, 2020, now Pat. No. 11,228,684.

(60) Provisional application No. 62/833,816, filed on Apr. 15, 2019.

(51) Int. Cl.
*H04M 15/00* (2006.01)
*H04L 12/14* (2006.01)
*H04W 4/24* (2018.01)

(52) U.S. Cl.
CPC ............ *H04M 15/44* (2013.01); *H04L 12/14* (2013.01); *H04M 15/43* (2013.01); *H04M 15/51* (2013.01); *H04M 15/745* (2013.01); *H04W 4/24* (2013.01); *H04M 2215/2026* (2013.01); *H04M 2215/32* (2013.01)

(58) Field of Classification Search
CPC ..... H04L 12/14; H04M 15/43; H04M 15/745; H04M 15/44; H04M 15/51; H04M 2215/2026; H04M 2215/32; H04W 4/24
USPC ......................................... 455/406
See application file for complete search history.

(56) References Cited

U.S. PATENT DOCUMENTS

| | | | |
|---|---|---|---|
| 2005/0076132 A1* | 4/2005 | Roberts | G06Q 30/02 709/228 |
| 2006/0107314 A1* | 5/2006 | Cataldi | G06F 16/958 707/E17.116 |
| 2019/0340109 A1* | 11/2019 | Barron-Kraus | G06F 11/3664 |

* cited by examiner

*Primary Examiner* — Huy C Ho
(74) *Attorney, Agent, or Firm* — WHITE AND WILLIAMS LLP (57) ABSTRACT

A system is provided enabling creation of a portal to telecommunications services managed by an enterprise user on behalf of accountholders of the enterprise. The system includes a first layer providing access to at least a business support system, an operational support system, a provisioning system, a home location register, and a billing system. The system also includes a second layer providing access to a wizard interface programmed for: creating a portal by the enterprise user with an application enabled to selectively access and/or modify data and settings accessible through a security layer from the first layer; and publishing the portal. The system also includes a third layer providing access to the portal by an accountholder of the enterprise after publishing. The application is: a glanceable application showing the data or settings in a summary visual fashion; or a full application showing the data or settings in a detailed fashion.

19 Claims, 5 Drawing Sheets

SYSTEM AND METHOD OF AUTOMATED CUSTOMIZABLE PORTAL CREATION

CROSS-REFERENCE TO RELATED APPLICATIONS

This application is a continuation of U.S. patent application Ser. No. 16/844,261, filed Apr. 9, 2020, now U.S. Pat. No. 11,228,684, which claims the benefit of U.S. Provisional Patent Application No. 62/833,816, filed Apr. 15, 2019, the contents of which are hereby incorporated by reference in their entirety.

FIELD OF INVENTION

The invention in general relates to automated customizable portal creation for the telco and service provider industries to allow end users at enterprises to make changes to their service packages. The invention uses a portal wizard so that enterprise users need not write any code to provide a full or glanceable application to end users.

BACKGROUND OF THE INVENTION

Backend systems installed at large service providers like telcos are not designed for direct customer (accountholder) access. Currently, changes to services must carried out be Customer Service Representatives (CSRs), who make the changes to different internal systems on behalf of the customers. Changes to the services are not linear. In many cases in order to provision a new service for a customer, a CSR is required to make changes to more than one backend system to effectively provision the service.

This process is rather cumbersome and slow and requires trained staff. A consumer is dependent on having to contact the service provider (usually over the phone) to get new services or to make changes to existing services. Opening the backend systems directly to the customers poses many security risks and is not a feasible option either.

Large enterprise customers of a service provider may also have their own internal users of the services. It would be advantageous to open the backend systems for service provisioning to these users without compromising security or integrity of the backend data.

Not all customers have the same services or the same privileges, therefore opening the backend systems to expose only an appropriate set of services for each customer is also critical.

Currently, in order to provide portals (e.g. online portals) for modifying or checking account settings requires significant developer time.

SUMMARY

Broadly speaking, the present invention provides a method and a system of automated customizable portal creation where an end user e.g. a user at a service provider can create a portal for the end users at the enterprise to connect to the backend/legacy systems of the service provider so that the end users at the enterprise can make changes to their services without requiring CSR assistance from the service provider.

Preferably, the portal can be created and customized without writing code. Such a customizable portal may have different associated applications. End users at an enterprise customer of the service provider may use the portal and associated applications for making changes to their service packages directly without requiring any help from a CSR of the service provider.

It would be advantageous to provide a method and a system where a non-developer can create customizable portals for interaction with backend systems that are not designed for direct customer access.

Unlike prior art methods the present invention may connect to different backend system like the OSS, BSS, Billing System and Provisioning Systems of service provides so that the end users can make changes to their service offerings without requiring CSR assistance.

The backend systems at service providers are not designed for direct customer access and therefore having an intermediate layer in the form of the portal and associated applications enables the customers (e.g. end users at an enterprise) to make changes to their service packages.

The system may be installed on a remote server that may be accessible over a network e.g. Internet or LAN (Local Area Network). In one embodiment a server may be a standalone computer that is connected to the internet or other network while in others embodiments it may refer to a set of networked computing devices.

In one embodiment a Wizard for portal and application creation may be provided as a graphical user interface (GUI) that may enable a user to create or modify a customizable portal without having to write any code.

In one embodiment an API Layer may be provided that is responsible for connecting to the backend systems and acquiring/writing information to these systems when users make changes to their service packages.

In one embodiment a Security Layer may be provided to be responsible for managing the access control of the different groups of users.

In one embodiment a created portal may further comprise of full applications and Glanceable applications which results from the user manipulations of the Wizard for portal and application creation. In this disclosure the term Glanceable may refer to applications that are designed to show only a summary of the information in a visual way to the end user. And the term Full Application may refer to applications that are designed to show detailed information to the end user.

"Glanceables" may refer to applications that are designed to show only a summary of the information in a visual way to the end user e.g. using a graph with given color schemes, or icons, or emojis or other symbols so that the user can easily understand the summarized information.

"Full Applications" may refer to applications that are designed to show detailed information to the end user.

The Glanceables and Full Applications may be implemented as web widgets. A web widget is a small stand-alone software application usually with a limited set of functionality that can be installed and executed within a web page. A web widget usually occupies a portion of a webpage and does something useful with information fetched from other websites and displayed in the said place. A mobile web widget has the same purpose and function as a web widget, but it is made for use on a mobile device such as mobile phone or tablet.

The Portal may be created by user(s) at the service provider and the enterprise users can configure what has been given to them as apps and Glanceables but they may not be able to create new apps.

In another embodiment any user(s) of the system may be able to create the Portal and associated Full apps and Glanceables.

In one embodiment a group of users who may be responsible for portal and application creation may use a desktop or any other device e.g. a tablet, or a SmartTV or the like where a browser and associated technologies may be installed to access the Wizard for portal creation.

In one embodiment a group of end users of the portal itself may use a desktop, a tablet, a SmartPhone or any other device e.g. a SmartTV or the like where a browser and associated technologies may be installed to access the portal in order to make changes to their service packages.

Thus different portals could be created, each customized for different enterprise customers based on the different sets of services that the enterprise may have chosen from the portfolio of the services that the service provider may have to offer. Thus a portal may be customized to be restricted to apps that only allow for changes to the services that the enterprise customer uses.

For example the service provider may offer landline telephony services, wireless telephony services, cable TV and internet services. A first enterprise customer who may have opted to use landline telephony services and internet services will have a customized portal where the end users can make changes to their landline service package and internet service package. Such a customizable portal with its associated applications can be advantageously created by using the systems and methods of this invention without having to write any code.

According to a first aspect of the invention, a system is provided enabling creation of a portal to telecommunications services managed by an enterprise user on behalf of accountholders of the enterprise. The system includes a first layer providing access to at least a business support system, an operational support system, a provisioning system, a home location register, and a billing system. The system also includes a second layer providing access to a wizard interface programmed for: creating a portal by the enterprise user with an application enabled to selectively access and/or modify data and settings accessible through a security layer from the first layer; and publishing the portal. The system also includes a third layer providing access to the portal by an accountholder of the enterprise after publishing. The application is: a glanceable application showing the data or settings in a summary visual fashion; or a full application showing the data or settings in a detailed fashion.

The application (whether glanceable or full) may be a web widget.

The wizard may be programmed to allow customization of the portal for the enterprise.

Preferably, the telecommunications services include at least one of telephony, wireless telephony, cable TV or internet service.

The portal may use a JSON. The creating step may include:
  creating a JSON for the portal;
  receiving a label of the application;
  receiving a selection of the application type, whether glanceable or full;
  receiving a selection of a visualization method; and
  receiving a REST API URL for data access.
The creating step may further include:
  receiving custom visual properties of the application.
The creating step may further include:
  receiving security settings of the application.
Preferably, the security settings include user privileges for at least one accountholder and at least one enterprise user.
The publishing step may further include:
  receiving a command to save the application; and
  receiving a command to preview the application.

Preferably, the data access connects to at least one data source in the first physical or logical layer.

Preferably, the data source has a data model which is parsed to determine its structure and relationships.

The creating step may further include selecting fields of data to be displayed. Preferably, the application displays a subset of the available data fields. The subset may be based on the user privileges defined for the application.

The glanceable application preferably includes at least one graphical, icon, emoji or symbolic element. The creating step may further include setting a color scheme of the element.

DETAILED DESCRIPTION

Before embodiments of the invention are explained in detail, it is to be understood that the invention is not limited in its application to the details of the examples set forth in the following descriptions or illustrated drawings. It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein. The invention is capable of other embodiments and of being practiced or carried out for a variety of applications and in various ways. Also, it is to be understood that the phraseology and terminology used herein is for the purpose of description and should not be regarded as limiting.

Before embodiments of the software modules or flow charts are described in detail, it should be noted that the invention is not limited to any particular software language described or implied in the figures and that a variety of alternative software languages may be used for implementation of the invention.

It should also be understood that many components and items are illustrated and described as if they were hardware elements, as is common practice within the art. However, one of ordinary skill in the art, and based on a reading of this detailed description, would understand that, in at least one embodiment, the components comprised in the method and tool are actually implemented in software.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Perl, Python and Ruby are examples of dynamic languages.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. A computing device may include a memory for storing a control program and data, and a processor (CPU) for executing the control program and for managing the data, which includes user data resident in the memory and includes buffered content. The computing device may be coupled to a video display such as a television, monitor, or other type of visual display while other devices may have it incorporated in them (iPad, iPhone etc.). An application or an app or other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example, and without limitation, the programmable computers may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on a server or mobile device or partly on the mobile device as a stand-alone software package; partly on the mobile device and partly on a remote computer or remote computing device or entirely on the remote computer or server or computing device. In the latter scenario, the remote computer may be connected to the mobile device through any type of network, including a local area network (LAN) or a wide area network (WAN), or the connection may be made to the internet through a mobile operator network (e.g. a cellular network).

Figure 1:
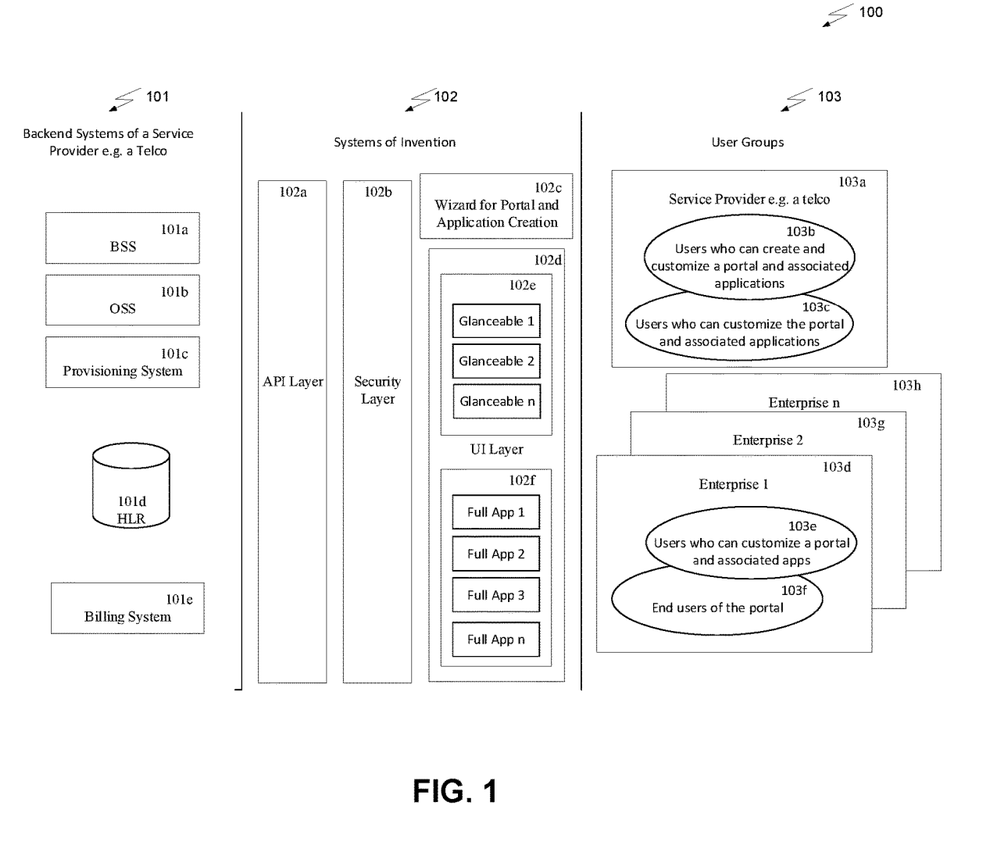
FIG. 1 is a system diagram illustrating the relationship between the systems of invention and the backend systems of a service provider on one end, and relevant user groups on the other end.

FIG. 1 shows one embodiment in which a system and method is provided for automated customizable portal creation. It would be advantageous to provide a method and a system where a non-developer can create customizable portals for interaction with backend systems that are not designed for direct customer access.

FIG. 1 shows the backend systems 101 of a service provider e.g. a telco. Such system may include BSS, OSS, Provisioning Systems, HLR and Billing System amongst a host of other backend infrastructure systems necessary to provide services to the end user and to facilitate service enablement.

The Business Support Systems (BSS) 101a are the computer systems (both hardware and software components) that may be used by a telecommunications service provider/operator to run its business operations towards customers. Business Support Systems generally enable four processes: product management, order management, revenue management and customer management. For example, BSS enable the taking of orders, resolving payment issues, revenues, etc.

The Operational Support Systems or Operations Support Systems (OSS) 101b are computer systems (including hardware and software) that are used by telecommunications service providers/operators to manage their networks (e.g., telephone networks). They support management functions such as network inventory, service provisioning, network configuration and fault management.

The Provisioning System 101c refers to the system or systems installed at a service provider e.g. a mobile telecom operator that enables the activation of services within the corresponding network element(s). The provisioning system also handles configuring the network for dynamically-oriented transactions like authentication, accounting, authorization, roaming, etc.

Provisioning involves the process of preparing and equipping a network to allow it to provide new services to its customers and may also refer to the provisioning of the customer's services to the network elements.

Mobile subscriber provisioning refers to the setting up of new services, such as GPRS, MMS and Instant Messaging for an existing customer of a mobile phone network, and any gateways to standard Internet chat or mail services. The service provider (or network operator) may typically send these settings to the customer's device e.g. a mobile phone using different methods depending on what the mobile operating system on the mobile device is capable of accepting.

A general example of provisioning can be data services, whereby a customer using a mobile device for voice calling may wish to add/switch to data services in order to access emails or browse the Internet. The customer's mobile device services are "provisioned" and thus the customer is able to use data services.

The Home Location Register (HLR) 101d is a central database that contains details of each mobile phone subscriber that is authorized to use the core network. There may be several logical, and physical HLRs in a mobile operator setup. The HLRs store details of every SIM card issued by the mobile operator.

The Billing System 101e is a software/hardware designed to support the telecommunications billing processes which may be responsible for collecting consumption data, calculating charging and billing information, producing bills for customers, processing their payments and managing debt collection.

The present system is depicted by 102 and may comprise of different logical or physical layers. In one embodiment the system has an API Layer 102a, a Security Layer 102b, a Wizard for portal and application creation 102c and the created portal 102d which may further include Glanceables 102e and Full applications 102f.

In one embodiment the Wizard for portal and application creation 102c may also be used for portal and application customization.

The system 102 may be installed on a remote server that may be accessible over a network e.g. Internet or LAN (Local Area Network). In one embodiment a server may be a standalone computer that is connected to the internet or other network while in other embodiments the server functionality may be provided by a set of networked computing devices.

The API Layer 102a is responsible for connecting to the backend systems and acquiring/writing information to these systems.

The Security Layer 102b is responsible for managing the access control of the different groups of users. In one embodiment the Security Layer 102b may also be responsible for managing the access control to the different types of content.

The Wizard for portal and application creation 102c is a graphical user interface (GUI) that enables a user to create or modify a customizable portal without having to write any code.

The created portal 102d which may further comprise of Glanceables 102e and full applications 102f which results as a product of the user manipulations of the Wizard for portal and application creation 102c.

Glanceables 102e may refer to applications that are designed to show only a summary of the information in a visual way to the end user e.g. using a graph with given color schemes, or icons, or emojis or other symbols so that the user can easily understand the summarized information.

Full Applications 102f may refer to applications that are designed to show detailed information to the end user.

The Glanceables 102e and Full Applications 102f may be implemented as web widgets.

A web widget is a small stand-alone software application usually with a limited set of functionality that can be installed and executed within a web page. A web widget usually occupies a portion of a webpage and does something useful with information fetched from other websites and displayed in the said place. A mobile web widget has the same purpose and function as a web widget, but it is made for use on a mobile device such as mobile phone or tablet.

FIG. 1 also depicts different User Groups 103. A service provider e.g. a telco 103a may have different groups of users responsible for performing different roles associated with the portal and application creation. The service provider may have a group of users who can create and customize a portal and associated applications 103b for the Enterprise Customers of the said service provider. The service provider may also have a group of users who can only customize the portal and associated application 103c while not being able to create the same. Both these groups of users may use the Wizard for portal and application creation 102c.

The service provider 103a may have multiple enterprise customers for example Enterprise Customer 1 103d, Enterprise Customer 2 103g, up to Enterprise Customer n 103h.

Each enterprise customer may have a group of users who may be responsible for customization of the portal and associated applications who may use the Wizard for portal and application creation 102c to make the changes to the portal and associated applications and a group of end users of the portal itself (sometimes referred to herein as "accountholders"—it will be appreciated that such users may be actual accountholders or prospective accountholders or their delegates or representatives).

For example, Enterprise Customer 1 103d may have a group of users who may be responsible for customization of portal and associated application 103e who may use the Wizard for portal and application creation 102c to make the changes to the portal and associated applications and a group of end users of the portal itself 103f.

Using the system and method offered by the disclosed invention different portals could be created, each customized for different enterprise customers based on the different sets of services that the enterprise may have chosen from the portfolio of the services that the service provider may have to offer. Thus a portal may be customized to be restricted to apps that only allow for changes to the services that the enterprise customer uses.

For example the service provider may offer landline telephony services, wireless telephony services, cable TV and internet services. A first enterprise customer who may have opted to use landline telephony services and internet services may have a customized portal where the end users can make changes to their landline service package and internet service package. Such a customizable portal with its associated applications can be advantageously created by using the systems and methods of this invention without having to write any code.

Similarly, a second enterprise customer may have opted to use wireless telephony services and internet services, thus their customized portal may be advantageously customized with apps that enable its employees to make changes to their wireless service packages and internet service packages. Thus, users at the service provider can advantageously create different customized portals for each of this enterprise customers without having to write any code.

A group of users who may be responsible for portal and application creation may use a desktop or any other device e.g. a tablet, or a SmartTV or the like where a browser and associated technologies may be installed to access the Wizard for portal creation.

A group of end users of the portal itself may use a desktop or any other device e.g. a SmartTV or the like where a browser and associated technologies may be installed to access the portal.

The Portal may be created by user(s) at the service provider and the enterprise users can configure what has been given to them as apps and Glanceables but they may not be able to create new apps.

Any user(s) of the system may be able to create the Portal and associated apps and Glanceables.

Figure 2:
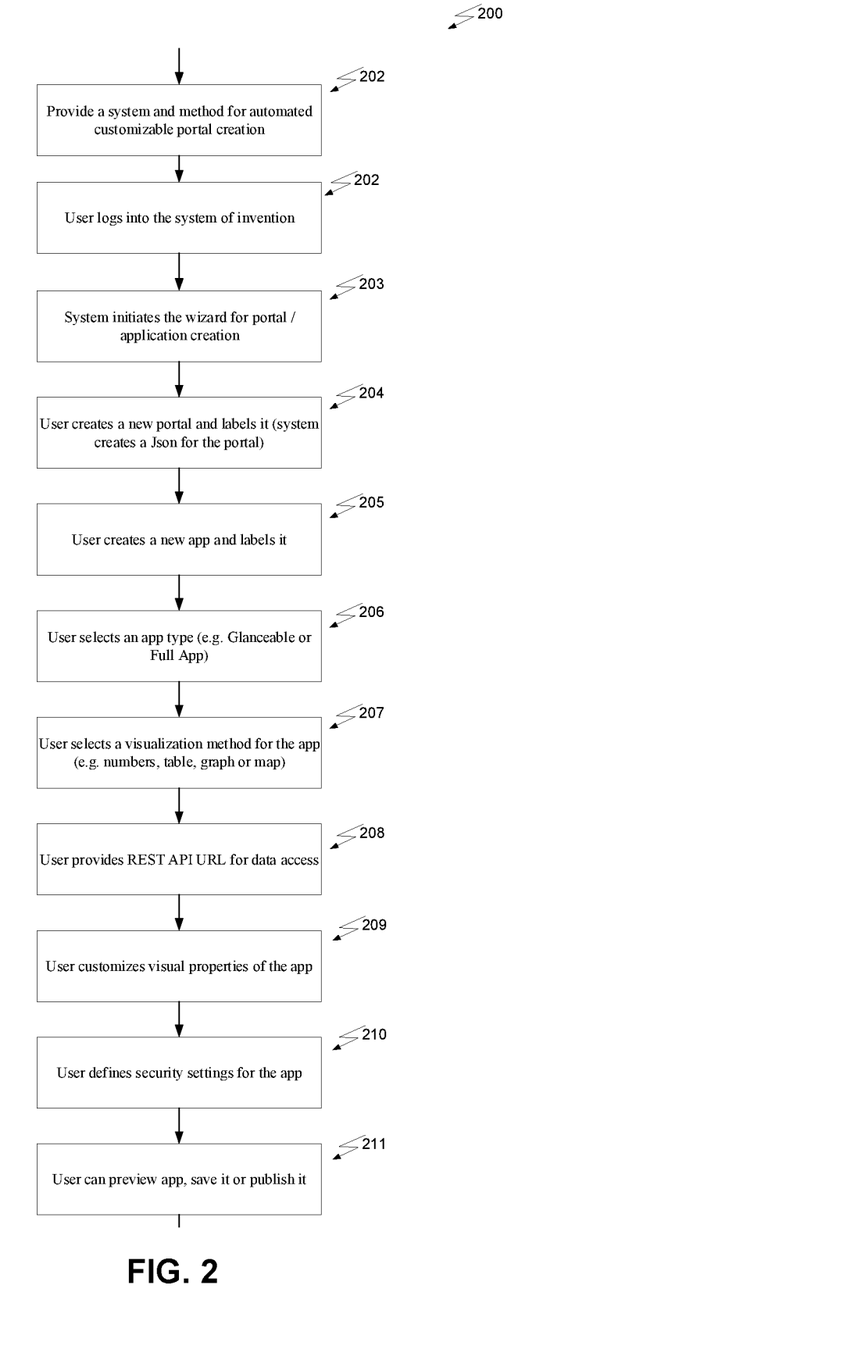
FIG. 2 is a flow diagram illustrating a method of rapid app creation and deployment using a portal wizard.

FIG. 2 shows one embodiment 200, in which a system and method is provided for automated customizable portal creation 201.

A user logs into the system 202. Such a user may have a role like that of a system administrator. For example, the user may log into the system from a desktop computer that is connected to the system of invention over a network e.g. a LAN or Internet. In another embodiment the user may also use a tablet or other such computing device that will enable the said user to access the system of invention over a network e.g. a WiFi network or a cellular data network.

The system initiates the wizard for portal/application creation 203 and enables the user to access the tools to enable said user to create a customizable portal without having to write any code.

The user creates a new portal and labels it (system creates a JSON for the portal) 204, e.g. gives it a name so that the portal and its related applications can be saved/stored on non-volatile memory of a server for later access.

The user creates a new app and labels it 205, e.g. gives it a name so that the application and its related files/data can be saved/stored on non-volatile memory of a server for later access.

The user selects an app type (e.g. Glanceable or Full App) 206. In this disclosure the term Glanceable may refer to applications that are designed to show only a summary of the information in a visual way to the end user. And the term Full Application may refer to applications that are designed to show detailed information to the end user.

The user selects a visualization method for the app 207, e.g. numbers, table, graph or map as a means for arranging data for display and interaction for the user.

The user provides REST API URL for data access 208, e.g. the user uses the below ticketing system API to create the TICKETS app.

Get: http:hostname:port/tnp-rest/tickets/
Create: http:hostname:port/tnp-rest/tickets/
Update: http:hostname:port/tnp-rest/tickets/
Delete: http:hostname:port/tnp-rest/tickets/{id}

The user customizes visual properties of the app 209.

The user defines security settings for the app 210, e.g. the user privileges for one or more groups of end users who will be accessing the created portal.

The user can preview the app, save it or publish it 211 to the system.

In one embodiment the functionality of the system of invention may be embedded in another system or software application e.g. an IDE.

Figure 3:
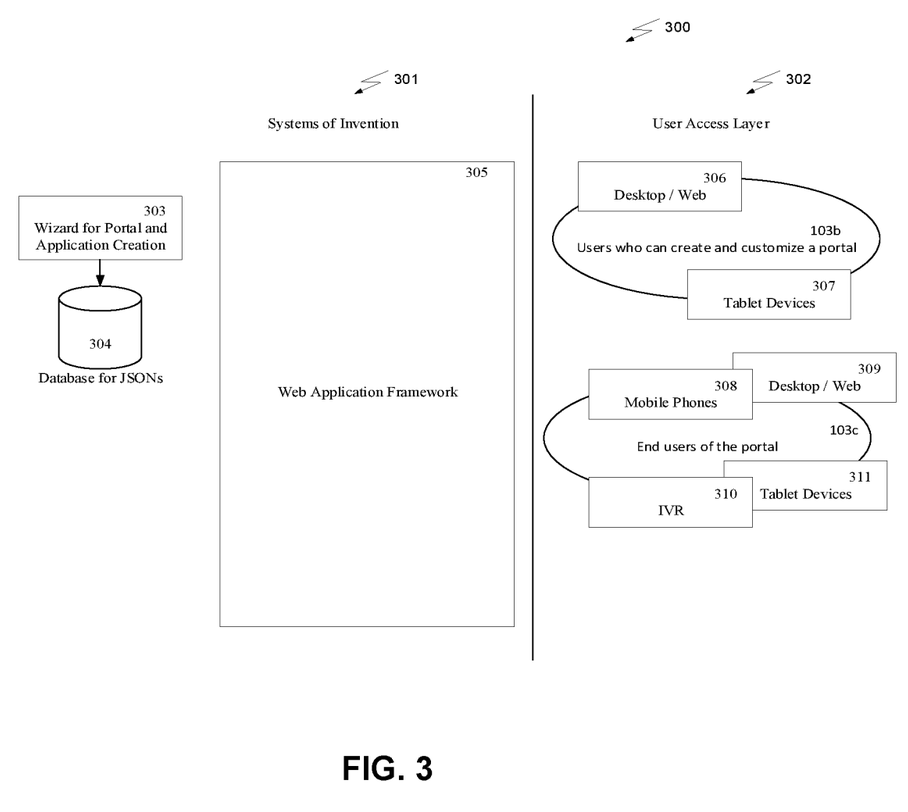
FIG. 3 is a system diagram illustrating the wizard and web application framework systems in greater detail.

FIG. 3 shows one embodiment 300 in which the present system is depicted by 301 which may include but is not limited to the Wizard for portal and application creation and customization 303, a database 304 for storing the JSONs that are created as a result of the user saving a new portal via the use of the Wizard 303.

JSON (JavaScript Object Notation) is a lightweight data-interchange format. It is easy for humans to read and write. It is easy for machines to parse and generate. JSON is a text format that is completely language independent but uses conventions that are familiar to programmers of the C-family of languages, including C, C++, C#, Java, JavaScript, Perl, Python, and many others. These properties make JSON an ideal data-interchange language. JSON is built on two structures:

- A collection of name/value pairs. In various programming languages, this is realized as an object, record, struct, dictionary, hash table, keyed list, or associative array.
- An ordered list of values. In most programming languages, this is realized as an array, vector, list, or sequence.

Virtually all modern programming languages support theses in one form or another. JSON data format is interchangeable with programming languages based on these structures.

A file or another method may be used for saving the JSONs, and the intent of the application is to provide a means for storing the JSONs in non-volatile memory of any type that may be suitable for the situation.

FIG. 3 also depicts the User Access Layer 302. There may be at least two groups of users, firstly the user who are responsible for creating and customizing a portal/applications 103b and a second group of users who are the end users of the portal and the applications 103c created by the first group of users.

Users 103b may use desktops 306 or tablet devices 307 to create and customize a portal without having to write any code and by accessing the Wizard 303. The application is not limited to the cited example of devices in fact the intent is to cover all such devices that may enable a user to access the Wizard 303 from a computing device.

End users 103c may use may use mobile phones 308, a desktop/web enabled computing devices 309, IVR (Interactive Voice Response) 310 or tablet devices 311 to access the portal and associated applications. The application is not limited to the cited example of devices in fact the intent is to cover all such devices and methods that may enable an end user to access the portal from a computing device with an interface.

In one embodiment an app that may be installed on a mobile device is used by an end user to request for a new product or a service that the service provider e.g. a mobile network operator may be providing to the said end user.

Figure 4:
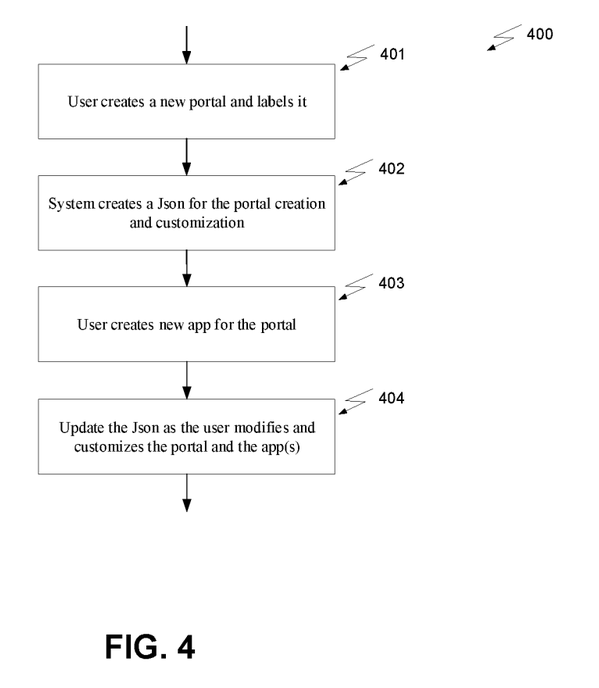
FIG. 4 is a flow diagram illustrating the creation of a portal.

FIG. 4 shows one embodiment 400. A user creates a new portal and labels it 401, e.g. gives it a name so that it can be uniquely identified and saved in the system.

The system creates a JSON for the portal creation and customization 402. This is shown in Code Snippet 1.

The user creates new app for the portal 403. In one embodiment the user creates a new app for the portal and information is saved to the JSON and preferably information for each application may be stored as a separate object. This is shown in Code Snippet 2.

The JSON is updated as the user modifies and customizes the portal and the app(s) 404. An exemplary code snippet before and after the modification are given below to illustrate the above step.

Exemplary JSON Before the Modifications:

```
{
  "defaultApp": false,
  "appType": "g-glanceable",
  "name": "Orders",
  "id": "Orders",
  "title": "Orders",
  "type": "Text",
  "configs": {
    "containerconfig": {
      "name": "",
      "type": "",
      "url": ""
    },
    "workbenchconfig": {
      "isNewApp": false,
      "userconfig": {
        "userGroups": null
      },
      "icon": "fa fa-check-square-o",
      "active": true,
      "label": "Orders",
      "type": "Text",
      "linkTo": null,
      "appType": "Glanceable",
      "chartType": "\"\"",
      "action": null,
      "previewconfig": null,
      "glanceColor": "#8320aa",
      "fieldConfigs": {
        "isCreate": false,
        "isDelete": null,
        "get": [
          {
            "barWidth": null,
            "isGroupBy": false,
            "autoRefresh": null,
            "color": null,
            "isRotatedAxis": false,
```

```
            "systemProperty": null,
            "show": true,
            "customName": "Total",
            "isHyperLink": false,
            "enumItems": null,
            "type": "",
            "chartHyperLink": null,
            "isReadOnly": false,
            "property": "total",
            "sortBy": null,
            "isMandatory": false
          }
        ],
        "create": [ ],
        "update": [ ],
        "delete": null,
        "isUpdate": false
      },
      "restConfigs": [
        {
          "scriptUrl": null,
          "password": null,
          "fileName": null,
          "menuList": [ ],
          "cssUrl": null,
          "appType": "Glanceable",
          "type": "Text",
          "userName": null,
          "url": "http:hostname:port/tnp-rest/glance/ordercount",
          "requestpayload": null
        }
      ]
    },
    "layoutconfig": {
      "sw": "260",
      "sh": "100",
      "column": "medium",
      "mw": "300",
      "row": "small",
      "mh": "130",
      "lw": "600",
      "lh": "170"
    }
  }
}
```

Figure 5:
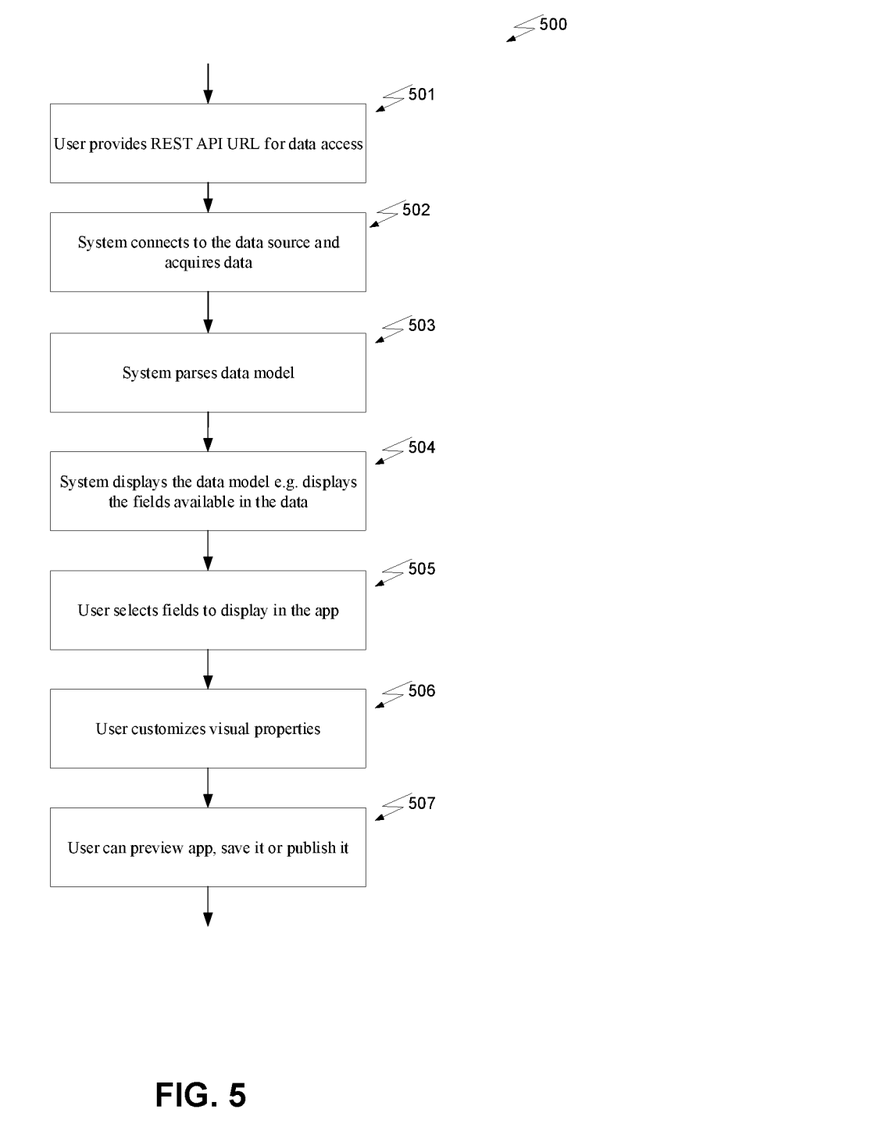
FIG. 5 is a flow diagram illustrating the process for connecting data to an app that has been developed.

FIG. 5 shows one embodiment 500. The user provides REST API URL for data access 501. In one embodiment such data may reside at the backend systems of a service provider or other such enterprise that preferably offers services and products to end users (consumers). In one embodiment the Security Layer 102b (as depicted in FIG. 1) may also be responsible for managing the access to different types of content. Thus a user can only access the appropriate data set that is associated with the privileges of their user group.

The system connects to the data source and acquires data 502, for example from the backend of one or more backend systems of a service provider. In one embodiment the connection may be over a computing network for example LAN or the Internet.

The system parses data model 503, which preferably includes analyzing the string of symbols (text or a sequence of tokens) in the data model to determine its structure and the relationships.

The system displays the data model e.g. displays the fields available in the data 504, e.g. displays the 20 different fields available in the data.

The user selects fields to display in the app 505. For example, there are 20 different fields available in the data and the user opts to display a subset of these (e.g. 14 fields) in the app.

The user customizes visual properties 506 of the data to be displayed in the app.

The user can preview app, save it or publish it 507.

It should be understood that although the terms browser/web-widget/app have been used as an example in this disclosure but in essence the term may also apply to any other piece of software code where the embodiments of the invention are incorporated. The software app or application can be implemented in a standalone configuration or in combination with other software programs and is not limited to any particular operating system or programming paradigm described here. Thus, this invention intends to cover all apps, software packages and user interactions described above as well as those obvious to the ones skilled in the art.

The program code may execute entirely on a mobile device or partly on the mobile device as a stand-alone software package; partly on the mobile device and partly on a remote computer or entirely on the remote computer or server. In the latter scenario, the remote computer may be connected to the mobile device through any type of network, including a local area network (LAN) or a wide area network (WAN), or the connection may be made to the internet through a mobile operator network (e.g. a cellular network).

Several exemplary embodiments/implementations of the invention have been included in this disclosure. There may be other methods obvious to persons skilled in the art, and the intent is to cover all such scenarios. The application is not limited to the cited examples, but the intent is to cover all such areas that may benefit from this invention. The above examples are not intended to be limiting, but are illustrative and exemplary.

What is claimed is:

1. A method for connecting accountholders of a telecommunications enterprise with telecommunications services available through the enterprise, where the enterprise is a customer of a telecommunications service provider, the method comprising:
    through a wizard, providing access to a portal creation utility by an authorized user of the enterprise, the portal creation utility accessing at least one backend system of the service provider selected from the group consisting of: a business support system, an operational support system, a provisioning system, a home location register, and a billing system,
    the wizard being programmed for:
        determining which services or sets of services the enterprise has contracted to offer from the service provider, the services or sets of services having associated data fields of a data model;
        enabling the authorized user to manipulate those data fields and customize visual properties to be displayed to accountholders through an application;
        enabling the portal to be published to accountholders of the enterprise; and
        making available the portal on behalf of the enterprise, wherein the portal is connected through a security layer to the at least one backend system and permits an accountholder to directly self provision a new telecommunications service that is available through the enterprise on a device of the accountholder without assistance of a customer service representative.

2. The method of claim 1, wherein the application is a glanceable application showing data or settings in a summary visual fashion.

3. The method of claim 1, wherein the application is a full application showing data or settings in a detailed fashion.

4. The method of claim 1, wherein the application is a web widget.

5. The method of claim 1, wherein the customization includes brand customization for the enterprise.

6. The method of claim 1, wherein the telecommunications services include at least one of telephony, wireless telephony, cable TV or internet service.

7. The method of claim 1, wherein the portal uses a JSON.

8. The method of claim 1, wherein the wizard is further programmed for:
creating a JSON for the portal;
receiving a label of the application;
receiving a selection of an application type, whether glanceable or full;
receiving a selection of a visualization method; and
receiving a Representational State Transfer (REST) API URL for data access.

9. The method of claim 8, wherein the visualization method includes at least one of: numbers, table, graph or map.

10. The method of claim 1, wherein the wizard is further programmed for:
receiving security settings of the application.

11. The method of claim 10, wherein the security settings include user privileges for at least one enterprise user.

12. The method of claim 10, wherein the security settings include user privileges for at least one accountholder.

13. The method of claim 1, wherein enabling the portal to be published further includes:
receiving a command to save the application; and
receiving a command to preview the application.

14. The method of claim 1, wherein the portal when made available accesses at least one data source of the at least one backend system.

15. The method of claim 14, wherein the data source is accessed through at least one API layer.

16. The method of claim 1, wherein the application includes at least one graphical, icon, emoji or symbolic element.

17. The method of claim 1, wherein the customization includes setting a color scheme.

18. The method of claim 1, wherein the device is a telecommunications device.

19. The method of claim 18, wherein the device is a mobile device.

* * * * *